3,836,667
METHOD OF PRODUCING BRONCHODILATION
Henry Oswald Jackson Collier, London, and Brian Thomas Warren, Ickenham, England, assignors to Miles Laboratories, Inc., Elkhart, Ind.
No Drawing. Filed Mar. 19, 1973, Ser. No. 342,741
Claims priority, application Great Britain, Mar. 24, 1972, 14,067/72
Int. Cl. A61k 27/00
U.S. Cl. 424—318                   3 Claims

ABSTRACT OF THE DISCLOSURE

The invention relates to the use of prostaglandin $A_1$ as a bronchodilating agent; the prostaglandin can be used in particular in alleviating the symptoms of *status asthmaticus* by injection.

---

This invention relates to the use of a certain prostaglandin of the A-type as a bronchodilating agent, and to pharmaceutical compositions containing this prostaglandin.

The prostaglandins (PG), a group of natural acid lipids, are known compounds having various pharmacological activities. The prostaglandins of the E-type relax guina pig isolated tracheal smooth muscle (Main, Brit. J. Pharmacol. Chemother., 1964, *22*, 511) and both $PGE_1$ and $PGE_2$ relax human isolated bronchial muscle (Sweatman and Collier, Nature, 1968, *217*, 69). The F-type prostaglandin ($PGF_{2a}$) contracts human isolated bronchial muscle (Sweatman and Collier, ibid); it also contracts this muscle when inhaled as an aerosol (Hedquist, Holmgen and Mathé, Acta Physiol. Scand., 1971, *82*, 29A; and Smith and Cuthbert, Brit. Med. J., 1972, *3*, 212). $PGE_1$ and $PGE_2$ have a superior bronchodilator activity to isoprenaline when administtered by aerosol to guinea pigs, dogs and monkeys (Large, Leswell and Maxwell, Nature, 1969, *224*, 78; Rosenthale, Dervinis, Begany, Lapidus and Gluckman, Experientia, 1970, *26*, 1119). However, $PGE_1$ and $PGE_2$ when administered to humans by aerosol consistently cause coughing and this effect was even found when salts of these prostaglandins were employed (Cuthbert, Brit. Med., J., 1969, *4*, 723; Herxheimer and Roetscher, Europ. J. Clin. Pharmacol., 1971, *3*, 123 and Cuthbert, Proc. Roy. Soc. Med., 1971, *64*, 15).

We have found that of the prostaglandins of the A-type ($PGA_1$ and $PGA_2$) which show compared to $PGE_1$ a reduced effect on smooth muscle, $PGA_1$ has surprisingly a more potent and longer-lasting bronchodilator activity than has $PGE_2$ when for example given intravenously in the standard Konzett-Rössler preparation of guina pig lungs *in vivo*.

The invention therefore provides a method of causing bronchodilation in mammals (including humans) by administering to the mammal $PGA_1$ or a pharmaceutically acceptable salt thereof. Suitable salts include the alkali metal, e.g. sodium or potassium, and the ammonium or amine salts.

The method is particularly useful in the treatment of asthma, especially *status asthmaticus*.

The $PGA_1$ can be administered in the form of a pharmaceutical composition comprising it and a pharmaceutically acceptable carrier or diluent.

For the treatment of asthma, the compositions will be sometimes in a form suitable for administration by inhalation. Thus the compositions may comprise a suspension or solution of the active ingredient in water or in a suitable solvent (e.g. alcohol) for administration as an aerosol by means of a conventional nebuliser. Alternatively, the compositions may comprise a suspension or solution of the active ingredient in a conventional liquefied propellant to be administered as an aerosol from a pressurised container. The compositions may also comprise the solid active ingredient in a solid diluent for administration from a powder inhalation device. Other routes of administration, e.g. sublingual, oral or buccal tablets, or capsules, or rectal suppository or intravenous injection or infusion can be used.

The compositions may also contain, in addition to the prostaglandin, other active ingredients for instance other bronchodilators, e.g. those of the $\beta$-adrenergic type, such as iso- or orci-prenaline or salbutamol or a pharmaceutically acceptable salt thereof. The composition may contain 0.1 to 10% by weight of $PGA_1$. If salbutamol or iso- or orci-prenaline sulphate is used, it is suitably present in a concentration of 0.1 to 5% by weight.

The inhalation by various prostaglandins of bistamine-induced bronchoconstriction in the guinea-pig (the Konzett-Rössler preparation *in vivo*) is shown in Table 1. The histamine challenge was given intravenously, in doses of 6.5 to 40 µg./kg., 15 sec. after intravenous administration of the prostaglandin in doses of 0.1 to 160 µg./kg.

TABLE 1

| Experiment No. | Dose of histamine challenge, µg./kg. i.v. | $ID_{50}$ [a] dose of $PGE_2$ or $PGE_1$ in µg./kg. i.v. | Relative potency | | | |
|---|---|---|---|---|---|---|
| | | | $PGE_1$ | $PGE_2$ | $PGA_1$ | $PGA_2$ |
| 1 | 20 | 1.75 | — | 100 | 178 | 43 |
| 2 | 13 | 0.3 | — | 100 | 334 | — |
| 3 | 40 | 52 | 100 | — | 42 | — |
| 4 | 40 | 0.8 | 100 | — | 80 | — |
| 5 | 12 | 0.34 | 100 | — | 33 | — |
| 6 | 6.5 | 1.0 | 100 | — | 77 | — |
| 7 | 20 | 0.1 | 100 | — | 33 | — |

[a] $ID_{50}$ is the dose that inhibits bronchoconstriction by 50 percent.

NOTE: i.v.=intravenously; —=Not administered.

Means result from experiments 1 and 2=256% of the bronchodilator potency of $PGE_2$ Mean result from experiments 3–7=54% of the bronchodilator potency of $PGE_1$.

$PGA_1$ was compared with aminophylline by intravenous injection in the guinea-pig. In the Konzett-Rössler preparation, $PGA_1$ was computed to be about 750 times as potent as aminophylline in reducing histamine-induced bronchoconstriction. The action of $PGA_1$ was, however, briefer than that of aminophylline. Because of this, a dose of 50 µg./kg. $PGA_1$ as a slow intravenous infusion over 10 min. is comparable to 12.5 mg./kg. aminophylline, i.e. a potency ratio of about 250:1.

Table 2 shows that effective doses of $PGA_1$ and aminophylline lower arterial blood pressure. In keeping with the brevity of its bronchodilator action, the hypotensive effect of $PGA_1$ was not only briefer but less intense than that of aminophylline. The latter was lethal, since at 100 times the effective dose, both of the two guinea-pigs died, whereas at an equivalent dose of $PGA_1$ neither animal died.

Table 3 shows that, like aminophylline, $PGA_1$ is effective in the presence of propranolol, whereas isoprenaline is not.

TABLE 2.—EFFECTS OF PGA₁ AND AMINOPHYLLINE ON GUINEA-PIG BLOOD PRESSURE

[ID₅₀: dose to inhibit by 50% histamine-induced bronchoconstriction]

| Drug | Dose, i.v. | Mean fall in arterial blood pressure (mm. Hg) | Time in minutes for blood pressure to return to normal |
|---|---|---|---|
| PGA₁ | 1.4–3.0 µg./kg. (approximately ID₅₀). | 5 | <2. |
|  | 14–30 µg./kg. (approximately 10× ID₅₀). | 19 | <2. |
|  | 140–300 µg./kg. (approximately 100× ID₅₀). | 23 | <2. |
| Aminophylline | 1.4–3.0 mg./kg. (approximately ID₅₀). | 10 | Approximately 4. |
|  | 14–30 mg./kg. (approximately 10× ID₅₀). | 29 | >20. |
|  | 140–300 mg./kg. (approximately 100× ID₅₀). | >58 | 2/2 animals died. |

TABLE 3

The effect of propanolol on inhibition by isoprenaline, aminophylline or PGA₁ of bronchoconstriction induced by histamine challenge in the guinea-pig Konzett-Rössler preparation in vivo.

| Drug | Dose, µg./kg., i.v. | Percent inhibition of bronchoconstriction | |
|---|---|---|---|
| | | Without propanolol | With propanolol, 5 mg./kg. i.v. |
| Isoprenaline sulphate | 0.43 | 100 | ¹ 0 |
| Aminophylline | 3,400 | 65 | 86 |
| PGA₁ | 0.43 | 79 | 100 |

¹ Indicates significantly ($P \leq 0.05$) less inhibition compared with control

NOTE.—Each value is the mean of two experiments.

A series of experiments was performed to show that PGA₁ is effective by other routes. The Konzett-Rössler preparation was modified to enable the drug to be given by aerosol via a tracheal cannula. In this modified technique, isoprenaline, PGE₁ and PGA₁ inhibited bronchoconstriction induced by intravenous injected histamine. The inhibitory potency of PGE₁ was 10–100 times greater than that of isoprenaline, whereas PGA₁ was approximately 10 times less potent than isoprenaline by this route.

A second series of experiments was performed to investigate the effectiveness of PGA₁ given orally in solution in 0.9% saline. In this technique, an aerosol of histamine (0.2% solution in saline) was administered by inhalation to conscious guinea-pigs and the preconvulsion time observed. Pretreatment of animals with a bronchodilator prolonged (sometimes indefinitely) the preconvulsion time. For reference, salbutamol (a known $\beta_2$ adrenergic receptor stimulant), was administered orally to groups of guinea pigs 45 min. before histamine challenge.

The results of this experiment are summarised in Table 4.

TABLE 4

Prolongation of pre-convulsion time by oral treatment with PGA₁ or salbutamol in guinea-pigs exposed to histamine aerosol

[Tests were performed 45 min. after administering drug by stomach tube in solution in 0.9% sodium chloride in water]

| Drug | Oral dose, mg./kg. | Total No. of animals | No. with— | |
|---|---|---|---|---|
| | | | Pre-convulsion time prolonged | Prolongation >5 mins. |
| PGA₁ | 0.5 | 8 | 6 | 2 |
| Salbutamol | 0.125 | 5 | 2 | 0 |
|  | 0.5 | 8 | 7 | 5 |

Salbutamol, at a dose of 0.5 mg./kg. prolonged the pre-convulsion time in 7 of 8 animals tested. The same dose of PGA₁ prolonged the pre-convulsion time in 6 of 8 animals. In one of these animals, the effect of PGA₁ lasted overnight. Such a marked prolongation was not observed with salbutamol.

PGA₁ was also active against histamine-induced bronchoconstriction in the guinea-pig when given as an aerosol. Ten guinea-pigs were each allowed to breathe an aerosol of histamine (1 mg./ml.) on two consecutive days and their precollapse times recorded. On the first day, five of the animals were pretreated for one min., with an aerosol of PGA₁ (1 mg./ml. in saline), 30 sec. prior to histamine, while the other five animals were pretreated with saline. On the second day, the pretreatments were crossed over. The results are shown in Table 5.

TABLE 5

| Concentration of PGA₁ solution | Mean prolongation of pre-collapse time (sec. ±S.E.) | Significance (paired t-test) |
|---|---|---|
| 1 mg./ml. | 59.3±6.9 | P=0.03 |

The value of PGA₁ as a bronchodilating agent is dependent in part on its relatively low pain or irritation producing properties. This was tested by the mouse abdominal constriction (writhing) test. As can be seen from Table 6 below, PGA₂ (like PGE₂) is a fairly powerful irritant though both were less irritant than PGE₁. PGA₁ however, causes much less irritancy than PGE₁ or PGE₂ and would thus be unlikely to cause coughing on inhalation. This unexpected finding reinforces the possibility that PGA₁ may be useful in the treatment of asthma and possibly other conditions involving bronchoconstriction in humans or domestic animals. The prostaglandins were employed in a control vehicle which was 20% v./v. ethanol.

TABLE 6.—POTENCIES OF PROSTAGLANDINS IN INDUCING ABDOMINAL CONSTRICTION (WRITHING) WHEN ADMINISTERED I.P. TO MICE

| Prostaglandin or reference material | Dose mg./kg.) intraperitoneally | Number of mice | Cumulative percent of mice responding by— | | |
|---|---|---|---|---|---|
| | | | 30 seconds | 2 minutes | 10 minutes |
| PGE₁ | ¹ 0.03 | 15 | ² 7 | ³ 20 | ³ 33 |
|  | ¹ 0.1 | 25 | 0 | ³ 32 | ³ 76 |
|  | 0.3 | 85 | 8 | ³ 49 | ³ 72 |
|  | ¹ 1.0 | 14 | ² 29 | ³ 57 | ³ 71 |
| PGE₂ | ¹ 0.1 | 20 | 0 | 5 | ³ 45 |
|  | ¹ 0.3 | 30 | 0 | ³ 30 | ³ 53 |
|  | ¹ 1.0 | 15 | 6 | 13 | ³ 47 |
| PGA₁ | 0.3 | 10 | 0 | 0 | 0 |
|  | 1.0 | 10 | 0 | 0 | 30 |
| PGA₂ | 0.3 | 10 | 0 | 20 | 50 |
|  | 1.0 | 10 | 10 | ² 40 | ² 60 |
| Control vehicle (20% v./v. ethanol). |  | 10 | 0 | 0 | 10 |
| Sodium chloride | ¹ 90 | 35 | 0 | 0 | 0 |
|  | ⁴ 400 | 20 | ² 35 | ² 55 | ² 60 |
| Acetylcholine bromide. | ⁴ 3.2 | 1,060 | ² 20 | ² 91 | ² 94 |

¹ Collier and Schneider, Nature New Biology, 1972, 236, 141.
² Significantly more responses than to vehicle ($p \leq 0.05$).
³ Significantly more responses than to vehicle ($p \leq 0.01$).
⁴ Collier, Dinneen, Johnson and Schneider, Brit. J. Pharmacol., 1968, 32, 295.

What is claimed is:

1. A method of producing bronchodilation in a mammal in need of bronchodilation therapy, which method comprises:
   administering to said mammal an effective amount of a substance selected from the group consisting of prostaglandin A₁ and a pharmaceutically acceptable salt thereof.

2. A method as in Claim 1 wherein said substance is administered by inhalation.

3. A method as in Claim 1 wherein said substance is administered by injection.

References Cited

Mathe et al.: J. of Pharmacy and Pharmacology, Vol. 23 (1971), pp. 905–910.

Bergstrom et al.: Pharmacological Reviews, Vol. 20, No. 1 (1968), p. 27.

SAM ROSEN, Primary Examiner

U.S. Cl. X.R.

424—305